(12) United States Patent
Sambongi

(10) Patent No.: US 10,641,609 B2
(45) Date of Patent: May 5, 2020

(54) ROUTE EXTRACTION APPARATUS FOR EXTRACTING BACKTRACK ROUTE

(71) Applicant: CASIO COMPUTER CO., LTD., Shibuya-ku, Tokyo (JP)

(72) Inventor: Masao Sambongi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 293 days.

(21) Appl. No.: 15/724,697

(22) Filed: Oct. 4, 2017

(65) Prior Publication Data
US 2018/0172448 A1 Jun. 21, 2018

(30) Foreign Application Priority Data

Dec. 20, 2016 (JP) .................................. 2016-247034

(51) Int. Cl.
| | | |
|---|---|---|
| *G01C 21/20* | (2006.01) | |
| *G01S 19/49* | (2010.01) | |
| *G06F 3/147* | (2006.01) | |
| *G01S 19/46* | (2010.01) | |

(52) U.S. Cl.
CPC .............. *G01C 21/20* (2013.01); *G01S 19/49* (2013.01); *G01S 19/46* (2013.01); *G06F 3/147* (2013.01)

(58) Field of Classification Search
CPC ......... G01C 21/20; G01S 19/49; G01S 19/46; G06F 3/147
See application file for complete search history.

(56) References Cited

U.S. PATENT DOCUMENTS

| | | | | |
|---|---|---|---|---|
| 5,561,790 | A | * 10/1996 | Fusaro .................. | G06F 17/509 703/26 |
| 2016/0265926 | A1* | 9/2016 | Sato ..................... | G01C 21/3617 |
| 2017/0115129 | A1* | 4/2017 | Lee ......................... | A61B 5/486 |
| 2018/0188047 | A1* | 7/2018 | Inoue ..................... | G01C 21/34 |

FOREIGN PATENT DOCUMENTS

| | | |
|---|---|---|
| JP | 2005189006 A | 7/2005 |
| JP | 2006105805 A | 4/2006 |
| JP | 2008032471 A | 2/2008 |
| JP | 2009103716 A | 5/2009 |
| JP | 2011002271 A | 1/2011 |
| JP | 2015095037 A | 5/2015 |

OTHER PUBLICATIONS

Japanese Office Action (and English language translation thereof) dated Oct. 23, 2018 issued in counterpart Japanese Application No. 2016-247034.

* cited by examiner

*Primary Examiner* — Mussa A Shaawat
(74) *Attorney, Agent, or Firm* — Holtz, Holtz & Volek PC

(57) ABSTRACT

A route extraction apparatus includes a processor, a position measurement unit that measures a position, and a storage unit. The processor executes storage processing of storing, in the storage unit, a moving history, from a starting position to a current position, measured by the position measurement unit, and route extraction processing of extracting, based on the moving history stored in the storage unit, an actually passed shortest route among a plurality of routes from the current position to the starting position.

20 Claims, 3 Drawing Sheets

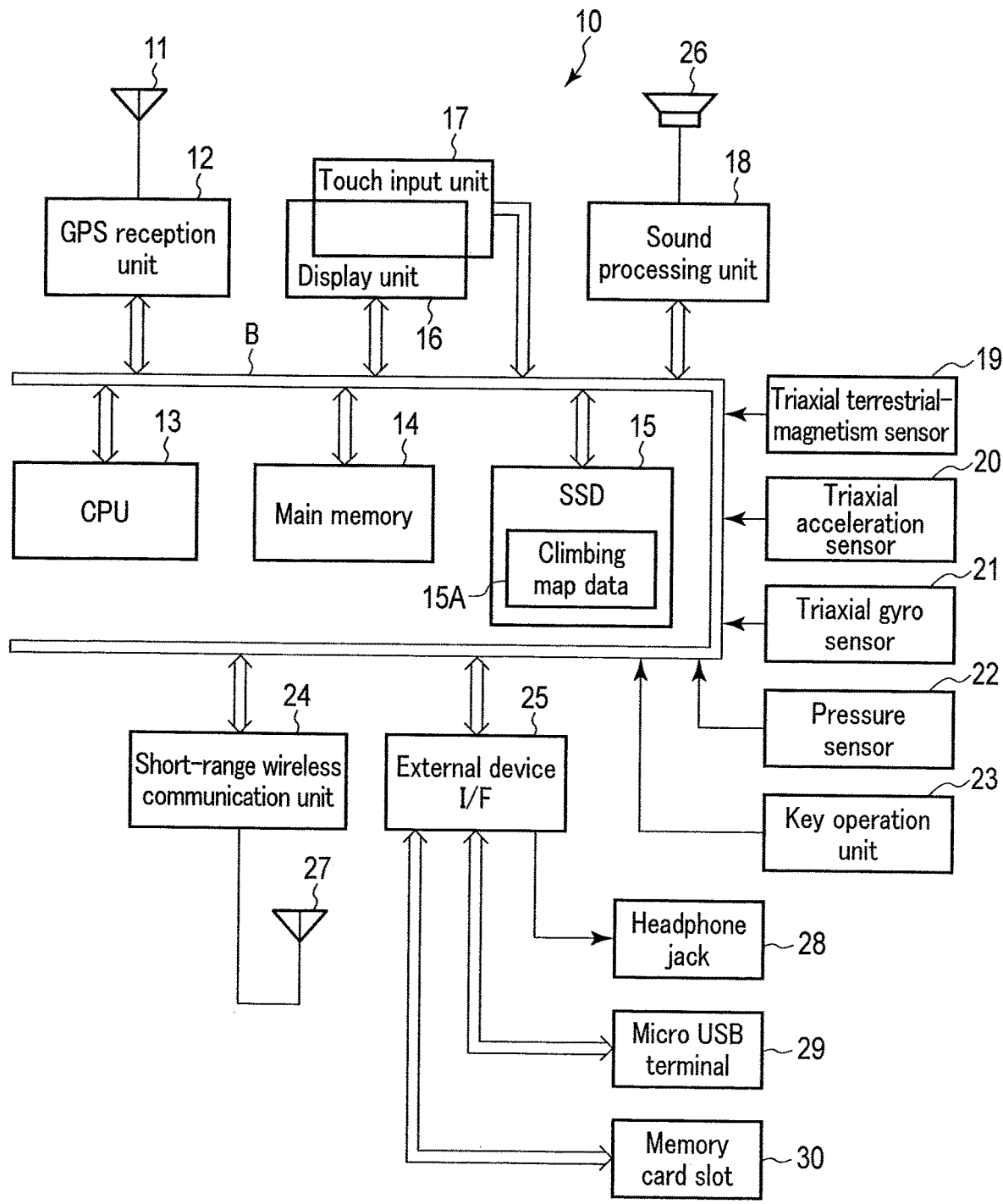
F I G. 1

ROUTE EXTRACTION APPARATUS FOR EXTRACTING BACKTRACK ROUTE

CROSS-REFERENCE TO RELATED APPLICATIONS

This application is based upon and claims the benefit of priority from Japanese Patent Application No. 2016-247034, filed Dec. 20, 2016, the entire contents of which are incorporated herein by reference.

BACKGROUND OF THE INVENTION

1. Field of the Invention

The present invention relates to a route extraction apparatus for extracting a backtrack route.

2. Description of the Related Art

A navigation apparatus has, as one of basic functions, a route guidance function of guiding a route from a current position to a destination. There is proposed a technique in which this type of navigation apparatus guides a return path based on a moving history stored in a forward path (for example, Jpn. Pat. Appln. KOKAI Publication No. 2005-189006).

SUMMARY OF THE INVENTION

According to one aspect of the present invention, there is provided a route extraction apparatus comprising: a processor; a position measurement unit that measures a position; and a storage unit, wherein the processor executes: storage processing of storing, in the storage unit, a moving history, from a starting position to a current position, measured by the position measurement unit, and route extraction processing of extracting, based on the moving history stored in the storage unit, an actually passed shortest route among a plurality of routes from the current position to the starting position.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the functional circuit arrangement of a climbing navigation apparatus according to an embodiment of the present invention;

DETAILED DESCRIPTION OF THE INVENTION

Figure 2:
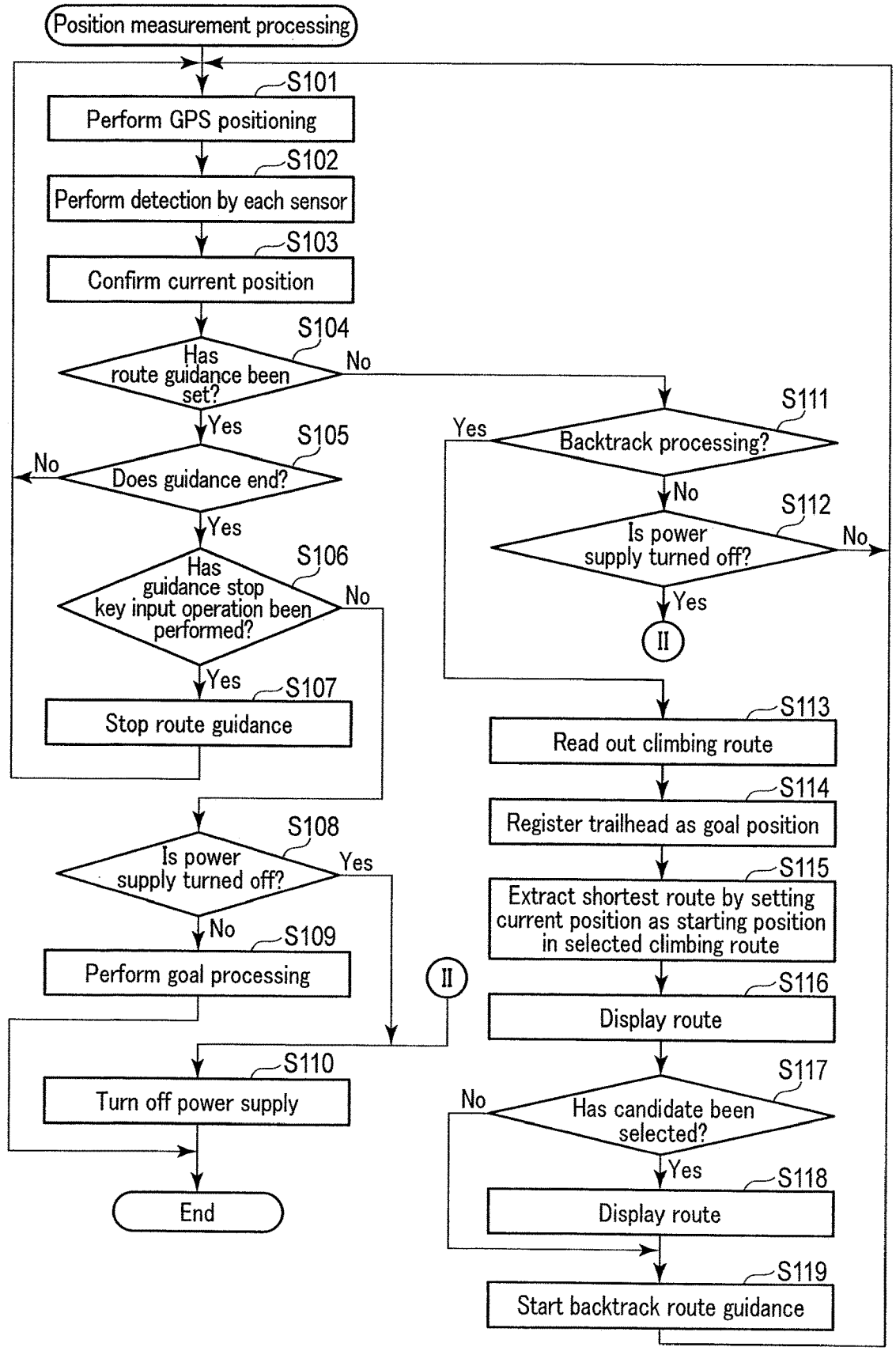
FIG. 2 is a flowchart illustrating processing contents at the time of backtrack route guidance in a navigation operation according to the embodiment.

An embodiment when the present invention is applied to a climbing navigation apparatus will be described in detail below with reference to the accompanying drawings.

FIG. 1 is a block diagram showing the functional circuit arrangement of a climbing navigation apparatus 10.

In the climbing navigation apparatus 10, based on incoming radio waves from at least four or more GPS (Global Positioning System) satellites (not shown), that are received by a GPS antenna 11, a GPS reception unit 12 calculates the three-dimensional coordinates of a current position, that is, a latitude, longitude, and altitude, and current time, and sends them to a CPU 13 via a bus B.

Note that the GPS antenna 11 and the GPS reception unit 12 may support a satellite positioning system other than the GPS, for example, GLONASS (GLObal NAvigation Satellite System) and QZSS (Quasi-Zenith Satellite System) as a Japanese regional navigation satellite system to receive incoming radio waves from satellites and calculate the three-dimensional coordinates of the current position and the current time with higher accuracy.

In this case, when it is described in the following explanation of an operation that GPS positioning is performed, it is assumed that a positioning operation by a satellite positioning system other than the GPS is also executed.

The CPU 13 controls the overall operation of the climbing navigation apparatus 10 using a main memory 14 and an SSD (Solid State Drive) 15 connected via the bus B.

The main memory 14 is formed by, for example, an SDRAM, and serves as a work memory when the CPU 13 executes a program. The SSD 15 is formed by a nonvolatile memory, and stores various operation programs necessary for a climbing route navigation operation, various permanent data including climbing map data 15A, and the like. The stored contents are loaded into the main memory 14 by the CPU 13 appropriately.

The climbing map data 15A stored in the SSD 15 is climbing topographic map data associated with the three-dimensional coordinates of each position, and the topographic map data includes contour lines and climbing route information as road information.

The bus B is also connected to a display unit 16, a touch input unit 17, a sound processing unit 18, a triaxial terrestrial-magnetism sensor 19, a triaxial acceleration sensor 20, a triaxial gyro sensor 21, a pressure sensor 22, a key operation unit 23, a short-range wireless communication unit 24, and an external device interface (I/F) 25.

The display unit 16 is formed by a color liquid crystal panel with a backlight and a driving circuit for it. The touch input unit 17 using a transparent electrode film is formed integrally with the display unit 16. The touch input unit 17 digitizes time-series coordinate signals corresponding to a touch operation by the user, and sends the obtained signals as touch operation signals to the CPU 13.

The sound processing unit 18 includes a sound source circuit such as a PCM sound source, which generates an analog sound signal in accordance with provided sound data, and causes a loudspeaker 26 to amplify the signal and emit it.

The triaxial terrestrial-magnetism sensor 19 is used to detect terrestrial magnetism in each of three axial directions orthogonal to each other, and can detect, based on the magnetic north direction, an orientation in which the climbing navigation apparatus 10 is made to face at this time.

The triaxial acceleration sensor 20 is used to detect an acceleration in each of the three axial directions orthogonal to each other, and can detect the attitude of the climbing navigation apparatus 10 based on the direction of the gravitational acceleration.

The triaxial gyro sensor 21 is formed by an oscillation gyro scope arranged in the three axial directions orthogonal to each other, and is used to execute an operation of updating the current position by autonomous navigation in cooperation with the triaxial acceleration sensor 20 by analyzing the operation of the user who holds or wears the climbing navigation apparatus 10 in combination with an output from the triaxial acceleration sensor 20 even in a state in which the current position cannot be recognized based on outputs from the GPS antenna 11 and the GPS reception unit 12.

The pressure sensor 22 is used to detect a pressure at this time. Even if the position accuracy of the current position acquired by the GPS antenna 11 and the GPS reception unit 12 degrades along with subsequent movement, the pressure sensor 22 can relatively calculate altitude information of the current position from pressure information obtained at this time based on pressure information obtained at a position where the measurement accuracy is high by converting pressure information into altitude information based on altitude information obtained when the measurement accuracy of the current position by the GPS antenna 11 and the GPS reception unit 12 is high.

The key operation unit 23 is formed by a power key, current position key, destination key, cursor key, enter key, and the like, all of which are provided in the housing of the climbing navigation apparatus 10, and sends, to the CPU 13 via the bus B, a key operation signal corresponding to a key operation for each of the keys.

By, for example, Bluetooth® SMART or ANT+, the short-range wireless communication unit 24 is wirelessly connected, via a short-range wireless communication antenna 27, to an external apparatus for which a paring setting has been made in advance.

The external device interface 25 allows, for example, headphones or earphones, a USB device, and a memory card to be connected or attached via a headphone jack 28, a micro USB terminal 29, and a memory card slot 30, respectively.

An operation according to this embodiment will be described next.

FIG. 2 shows processing contents when the CPU 13 displays the current position on a climbing map on the display unit 16 based on the current position obtained by the GPS antenna 11 and the GPS reception unit 12, and the climbing map data 15A stored in the SSD 15.

This processing is executed when the CPU 13 reads out the operation programs, the climbing map data 15A, and the like stored in the SSD 15, and loads and stores them in the main memory 14. The processing contents are performed along with GPS positioning which is executed once in a time cycle preset by the user of the climbing navigation apparatus 10, for example, every 60 [sec].

First, the CPU 13 causes the GPS antenna 11 and the GPS reception unit 12 to measure the current position (step S101).

The CPU 13 causes the triaxial terrestrial-magnetism sensor 19, the triaxial acceleration sensor 20, the triaxial gyro sensor 21, and the pressure sensor 22 to parallelly execute measurement, and primarily holds respective detection outputs in the main memory 14 (step S102).

Next, the CPU 13 executes correction based on the detection outputs from the respective sensors, which are obtained in step S102 based on the current position acquired in immediately preceding step S101, confirms the correct current position, and stores the confirmed current position as a passage history in the main memory 14. At the same time, the CPU 13 reads out, from the climbing map data 15A in the SSD 15, a given range corresponding to a display scale set at this time by setting the current position as a central coordinate point, displays a map with the current position as the center on the display unit 16, and superimposes and displays the current position on the map (step S103).

Note that the passage history stored in the main memory 14 is appropriately transferred to the SSD 15 in a timing cycle, and stored in it. At the same time, when the power supply of the climbing navigation apparatus 10 is turned off, the passage history is automatically transferred to the SSD 15 and recorded in it, thereby backing up the data.

At this time, the CPU 13 determines whether route guidance has been set (step S104). If it is determined that route guidance has been set (YES in step S104), when there is information based on which route guidance is to be performed in correspondence with the current position, the CPU 13 appropriately displays the information on the display unit 16, and determines whether the timing of ending the route guidance has come (step S105).

The route guidance ends when the touch input unit 17 detects a touch operation corresponding to a predetermined key of the key operation unit 23 or a "guidance stop" button displayed in the end portion of a screen on the display unit 16 and the route guidance is stopped in response to an arbitrary key operation or the like by the user of the climbing navigation apparatus 10, when the user reaches the destination on the guided route, or when the power supply of the climbing navigation apparatus 10 is turned off by the operation of the power key of the key operation unit 23 or exhaustion of a battery as the power supply of the climbing navigation apparatus 10.

If it is determined in step S105 that the timing of ending the route guidance has not come (NO in step S105), the CPU 13 returns to the processing in step S101 to continue the measurement of the current position and the display on the display unit 16 in the state.

If it is determined in step S105 that the timing of ending the route guidance has come (YES in step S105), the CPU 13 determines whether an arbitrary key operation or the like has been input by the user of the climbing navigation apparatus 10 to end the route guidance (step S106).

If it is determined that a key input operation has been performed (YES in step S106), the CPU 13 stops the route guidance processing in accordance with the key input operation, and determines to perform only display of the current position (step S107), thereby returning to the processing in step S101.

If it is determined in step S106 that the timing of ending the route guidance has come by an operation other than the input of the key operation or the like (NO in step S106), the CPU 13 determines whether to turn off the power supply of the climbing navigation apparatus 10 due to the operation of the power key of the key operation unit 23 or exhaustion of the battery as the power supply of the climbing navigation apparatus 10 (step S108).

If it is determined that the power supply is turned off due to the operation of the power key or exhaustion of the battery as the power supply of the climbing navigation apparatus 10 (YES in step S108), the CPU 13 temporarily turns off the power supply of the climbing navigation apparatus 10 at this time (step S110), thereby ending the processing shown in FIG. 2.

If it is determined in step S108 that the timing of ending the route guidance has come by an operation other than the operation of the power key of the key operation unit 23 or exhaustion of the battery as the power supply of the climbing navigation apparatus 10 (NO in step S108), it is inevitably considered that the user has arrived at the destination in the route guidance, and necessary guide message output processing is performed to output, for example, "you have arrived at the destination and therefore the route guidance will end" by a text message on the display unit 16 and a guidance voice emitted from the loudspeaker 26 (step S109), thereby ending the processing shown in FIG. 2.

In this case, if neither a key operation for the key operation unit 23 nor a touch operation for the touch input unit 17 is performed before a predetermined time elapses in accordance with presetting, the power supply may be automatically turned off to avoid unnecessary power consumption.

If it is determined in step S104 that the route guidance has not been set (NO in step S104), the CPU 13 determines whether backtrack processing starts or backtrack processing is in progress, in accordance with whether contents of the passage history stored so far in a state in which no route guidance is set overlap the current position and the current moving direction is opposite with respect to the contents of the passage history (step S111).

If it is determined that backtrack processing need not be performed (NO in step S111), the CPU 13 determines whether the power supply of the climbing navigation apparatus 10 is turned off due to the operation of the power key of the key operation unit 23 or exhaustion of the battery as the power supply of the climbing navigation apparatus 10 (step S112).

If it is determined that the power supply is turned off due to the operation of the power key or exhaustion of the battery as the power supply of the climbing navigation apparatus 10 (YES in step S112), the CPU 13 advances to step S110 to temporarily turn off the power supply of the climbing navigation apparatus 10, thereby ending the processing shown in FIG. 2.

If it is determined in step S112 that the power supply of the climbing navigation apparatus 10 is not turned off (NO in step S112), the CPU 13 determines to continue an operation state in which only the measurement of the current position and display are performed without executing either route guidance or backtrack processing, and returns to the processing in step S101.

Furthermore, if it is determined in step S111 that the backtrack processing starts or the backtrack processing is in progress (YES in step S111), the CPU 13 reads out, based on only the passage history stored in the main memory 14, a route to backtrack the climbing route on the climbing map (step S113), and then executes processing of registering a trailhead on the route as a destination goal position (step S114).

The CPU 13 sets the current position as a starting position using the stored passage history, and then extracts a shortest backtrack route (step S115).

If the passage history includes a piston (a reciprocal movement section where the user climbs and returns the same section) on the backtrack route, a route to the goal position by reciprocally moving the same section and a route to the goal position without passing through the section are considered. The climbing navigation apparatus 10 according to this application extracts a shortest backtrack route by deleting the section from the route.

The extracted shortest backtrack route is superimposed and displayed on the climbing map on the display unit 16 (step S116). A simple indication for selecting another backtrack route including the deleted piston is displayed together in the end portion of the display unit 16.

If, for example, the piston includes a bathroom and the climber wants to go down the mountain by stopping the bathroom, the CPU 13 determines based on an input from the touch input unit 17 whether the other backtrack route candidate has been selected in the display state on the display unit 16 (step S117).

If it is determined that the other backtrack route candidate has been selected (YES in step S117), the CPU 13 displays the selected other backtrack route in the climbing map on the display unit 16 (step S118).

After that, the CPU 13 starts an operation of guiding the current position and the returning direction in accordance with the backtrack route displayed on the display unit 16 at this time (step S119), and returns to the processing in step S101 to continue the backtrack processing.

While the backtrack processing is continued, the processes in steps S101 to S104, S111, S113 to S119 are repeatedly executed.

Note that if only one route is obtained in step S115, the route is inevitably displayed in the climbing map on the display unit 16 in step S116, and the processes in steps S117 and S118 are skipped.

Figure 3:
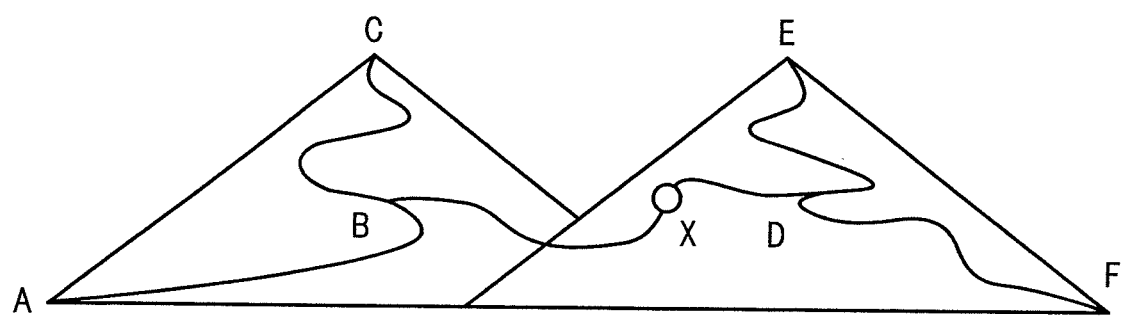
FIG. 3 is a schematic view for explaining a climbing course.

A case in which the climber holding the climbing navigation apparatus 10 described in detail above climbs a climbing course shown in FIG. 3 will be described.

In the climbing course, assume that the climber makes a climbing plan to start trailhead A of a left mountain, climb to top C of the left mountain by passing through position B, go down the same course to position B, climb to top E of a right mountain via position D of the right mountain, go down the same course to position D, and set trailhead F of the right mountain as a goal.

Assume also that during execution of the climbing plan, the climber traverses A→B→C→B, gives up climbing at position X on the way to position D due to a bad weather, and returns to trailhead A of the left mountain. In this case, a conventional climbing GPS logger that indicates a backtrack route presents a backtrack route of X→B→C→B→A. However, the climbing navigation apparatus 10 according to this embodiment deletes a section as a piston of B→C→B, and presents a shortest backtrack route of X→B→A in the route the climber actually passed through.

As described in detail above, according to this embodiment, it is possible to present an efficient backtrack route to move more safely.

Especially in the above embodiment, an apparently unnecessary section is automatically deleted by deleting a section as a piston from the backtrack route, thereby making it possible to efficiently present a backtrack route.

Although not explained in the above embodiment, an apparatus such as a climbing GPS logger may output information about the extracted backtrack route to an external apparatus such as a wearable terminal using, for example, a short-range wireless communication means, or provide simple presentation on the display unit of the GPS logger by presenting the distance to the branch position of the route or the distance of the remaining route, the direction in which the climber should advance at the branch position, and the like.

In the above embodiment, the climbing navigation apparatus 10 displays the backtrack route in the climbing map displayed on the display unit 16. Thus, it is possible to grasp the progress status of the whole distance, the environment of the next climbing route on the route, and the like, and the climber can advance along the backtrack route without anxiety.

In this case, it is possible to perform guidance display that is more user-friendly and is easy to see, by superimposing and displaying a next moving direction on the backtrack route in the climbing map.

In the above embodiment, if a plurality of backtrack routes can be found, the user can select a candidate other than the shortest route, as needed. Thus, the user can select an arbitrary route based on a factor other than the length of the route in the passage history, for example, the difficulty of passage of the climbing route itself.

The embodiment has been explained by assuming that a passage history is automatically stored when performing GPS positioning. However, a passage history may be stored by setting a trailhead as a starting position in accordance with the climbing map data 15A stored in the SSD 15. This makes it possible to use the memory capacities of the SSD 15, the memory card attached to the memory card slot 30, and the like without wasting them.

In addition, although not explained in the above embodiment, for example, assume that a mode of executing processing of intermittently measuring the current position is settable regardless of ON/OFF of the power supply of the climbing navigation apparatus 10. In this case, by starting to automatically store a passage history at a trailhead at the time of an operation in the mode, it is possible to avoid a situation in which the climber forgets to turn on the power supply of the apparatus and thus the trailhead cannot be set later as a destination in a backtrack route.

In the above embodiment, if the contents of the passage history stored so far in the state in which no route guidance is set overlap the current position and the current moving direction is opposite with respect to the contents of the passage history, the backtrack processing starts. However, the backtrack processing may start by providing a backtrack start key in the key operation unit 23 or assigning, to the touch input unit 17, a key operation of instructing to start backtracking.

In the above embodiment, in route guidance including backtracking, the map with the current position as the center is displayed on the display unit 16 and the route is displayed on the map. However, without displaying the map on the display unit 16, a goal may be simply displayed. For example, an arrow indicating the advancing direction may be displayed, and an instruction may be provided to the climber to walk in the direction indicated by this arrow.

In the above embodiment, route guidance is performed. However, no route guidance need not be performed by only displaying a backtrack route on the map.

In the above embodiment, route guidance is performed by executing display on the display unit 16. However, route guidance may be performed by a voice.

In the above embodiment, the climbing navigation apparatus 10 extracts a backtrack route and presents the extracted route by, for example, displaying it. However, the climbing navigation apparatus 10 may extract a backtrack route, output information about the extracted backtrack route to the outside, and present the output information about the backtrack route in an external apparatus different from the climbing navigation apparatus 10.

In the above embodiment, the shortest backtrack route is extracted by deleting a piston at the start of the backtrack processing. However, the piston may be deleted when the climber arrives at a position where the piston exists while going down the mountain.

The present invention is not limited to the climbing navigation apparatus that displays the current position on the climbing map, and is equally applicable to a car navigation apparatus that displays a general road map, an application program for executing a navigation operation in cooperation with a wearable terminal, that is installed in a mobile information terminal such as a smartphone, and the like.

The present invention is not limited to the above-described embodiment and various modifications can be made without departing from the scope of the present invention in practical stages. The respective embodiments may be appropriately combined and practiced. In this case, a combined effect is obtained. The above-described embodiment incorporates various kinds of inventions, and various kinds of inventions can be extracted by combinations selected from the plurality of disclosed constituent elements. For example, even if some constituent elements are deleted from all the constituent elements disclosed in the embodiment, an arrangement from which some constituent elements are deleted can be extracted as an invention as long as the problem can be solved and the effect can be obtained.

What is claimed is:

1. A mountain-traversing route extraction apparatus comprising:
    a processor;
    a position measurement unit that measures a position; and
    a storage unit,
    wherein the processor executes:
    storage processing of storing, in the storage unit, a moving history, from a mountain-traversing starting position to a current position, measured by the position measurement unit,
    backtrack determination processing of determining an occurrence of backtracking in which a moving to a destination is stopped and a route already tracked is backtracked, when contents of the moving history stored in the storage unit overlaps a current position and a current moving direction is opposite with respect to the contents of the moving history, and
    route extraction processing of extracting, based on the moving history stored in the storage unit, an actually passed shortest route among a plurality of routes from the current position to the mountain-traversing starting position, when the occurrence of the backtracking is determined in the backtrack determination processing.

2. The apparatus of claim 1, wherein in the route extraction processing, the actually passed shortest route is extracted by deleting a reciprocal movement section from a route from the current position to the mountain-traversing starting position.

3. The apparatus of claim 1, further comprising:
    a data output unit that outputs data,
    wherein the processor executes output processing of outputting, to the data output unit, the route extracted in the route extraction processing.

4. The apparatus of claim 1, further comprising:
    a display unit,
    wherein the processor executes presentation processing of presenting, on the display unit, the route extracted in the route extraction processing.

5. The apparatus of claim 4, wherein in the presentation processing, a next moving direction is presented by the route extracted in the route extraction processing and a position of the current position measured by the position measurement unit.

6. The apparatus of claim 4, wherein
    the processor executes map acquisition processing of acquiring map information, and
    in the presentation processing, the route extracted in the route extraction processing is superimposed and presented on the map information obtained in the map acquisition processing.

7. The apparatus of claim 6, wherein in the presentation processing, a next moving direction on the route extracted in the route extraction processing is presented in a map based on the map information obtained in the map acquisition processing.

8. The apparatus of claim 1, wherein
the processor executes change acceptance processing of accepting a change instruction to another route, and
in the route extraction processing, the route for which the change instruction has been provided in the change acceptance processing is extracted instead of the shortest route.

9. The apparatus of claim 1, wherein in the storage processing, a moving history of a climbing route having a trailhead as the mountain-traversing starting position is stored in the storage unit.

10. The apparatus of claim 9, wherein in the storage processing, storage of the moving history automatically starts when the position measured by the position measurement unit coincides with the preset trailhead.

11. A mountain-traversing route extraction method for an apparatus including a position measurement unit that measures a position and a storage unit, the method comprising:
storing, in the storage unit, a moving history, from a mountain-traversing starting position to a current position, measured by the position measurement unit;
determining an occurrence of backtracking in which a moving to a destination is stopped and a route already tracked is backtracked, when contents of the moving history stored in the storage unit overlaps a current position and a current moving direction is opposite with respect to the contents of the moving history; and
extracting, based on the moving history stored in the storage unit, an actually passed shortest route among a plurality of routes from the current position to the mountain-traversing starting position, when the occurrence of the backtracking is determined.

12. The method of claim 11, wherein in the extracting, the actually passed shortest route is extracted by deleting a reciprocal movement section from a route from the current position to the mountain-traversing starting position.

13. The method of claim 11, wherein
the apparatus includes a data output unit that outputs data, and
the method further comprises outputting, to the data output unit, the route extracted in the extracting.

14. The method of claim 11, wherein the apparatus includes a display unit, and the method further comprises presenting, on the display unit, the route extracted in the extracting.

15. The method of claim 14, wherein in the presenting, a next moving direction is presented by the route extracted in the extracting and a position of the current position measured by the position measurement unit.

16. The method of claim 14, further comprising:
acquiring map information,
wherein in the presenting, the route extracted in the extracting is superimposed and presented on the map information obtained in the acquiring.

17. The method of claim 16, wherein in the presenting, a next moving direction on the route extracted in the extracting is presented in a map based on the map information obtained in the acquiring.

18. The method of claim 11, further comprising:
accepting a change instruction to another route, wherein in the extracting, the route for which the change instruction has been provided in the accepting is extracted instead of the actually passed shortest route.

19. The method of claim 11, wherein in the storing, a moving history of a climbing route having a trailhead as the mountain-traversing starting position is stored in the storage unit, and storage of the moving history automatically starts when the position measured by the position measurement unit coincides with the preset trailhead.

20. A non-transitory computer-readable storage medium having a program stored thereon which controls a computer incorporated in an apparatus including a position measurement unit that measures a position and a storage unit, to perform functions comprising:
storing, in the storage unit, a moving history, from a mountain-traversing starting position to a current position, measured by the position measurement unit,
determining an occurrence of backtracking in which a moving to a destination is stopped and a route already tracked is backtracked, when contents of the moving history stored in the storage unit overlaps a current position and a current moving direction is opposite with respect to the contents of the moving history, and
extracting, based on the moving history stored in the storage unit, an actually passed shortest route among a plurality of routes from the current position to the mountain-traversing starting position, when the occurrence of the backtracking is determined.

* * * * *